United States Patent
Richards

(10) Patent No.: US 12,445,859 B2
(45) Date of Patent: Oct. 14, 2025

(54) RADAR METADATA IN FRONTHAUL MANAGEMENT PLANE SIGNALING

(71) Applicant: Telefonaktiebolaget LM Ericsson (publ), Stockholm (SE)

(72) Inventor: Christopher Richards, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 407 days.

(21) Appl. No.: 17/928,348

(22) PCT Filed: Jun. 2, 2020

(86) PCT No.: PCT/IB2020/055201
§ 371 (c)(1),
(2) Date: Nov. 29, 2022

(87) PCT Pub. No.: WO2021/245441
PCT Pub. Date: Dec. 9, 2021

(65) Prior Publication Data
US 2023/0209361 A1    Jun. 29, 2023

(51) Int. Cl.
*H04W 16/14* (2009.01)
*G01S 7/02* (2006.01)

(52) U.S. Cl.
CPC ............ *H04W 16/14* (2013.01); *G01S 7/021* (2013.01)

(58) Field of Classification Search
CPC ................................. H04W 16/14; G01S 7/021
See application file for complete search history.

(56) References Cited

U.S. PATENT DOCUMENTS

| | | | |
|---|---|---|---|
| 2012/0229329 A1* | 9/2012 | Steer | G01S 7/021 342/173 |
| 2015/0304853 A1 | 10/2015 | Murray et al. | |
| 2015/0323660 A1* | 11/2015 | Hampikian | G01S 13/347 342/109 |

(Continued)

FOREIGN PATENT DOCUMENTS

| | | |
|---|---|---|
| CN | 104885545 A | 9/2015 |
| CN | 108476410 A | 8/2018 |

(Continued)

OTHER PUBLICATIONS

International Search Report and Written Opinion dated Mar. 16, 2021 issued in PCT Application No. PCT/IB2020/055201, consisting of 13 pages.

(Continued)

*Primary Examiner* — Kent Krueger
(74) *Attorney, Agent, or Firm* — Weisberg I.P. Law, P.A.

(57) ABSTRACT

Apparatuses and methods related to radar metadata in fronthaul control and/or management plane signaling are disclosed. In one embodiment, a radio unit network node is configured to detect a radar signal; and based at least in part on the detection, send a message to one of a digital unit, DU, network node and a management network node, the message comprising information about the detected radar signal. In one embodiment, a network node is configured to receive a message from a radio unit, RU, network node, the message comprising information about a radar signal detected by the RU network node; and as a result of the received message, perform an operational task.

15 Claims, 7 Drawing Sheets

(56) References Cited

U.S. PATENT DOCUMENTS

| | | | | |
|---|---|---|---|---|
| 2017/0134961 | A1* | 5/2017 | Ghosh | H04W 16/14 |
| 2017/0257773 | A1* | 9/2017 | Boudreau | H04W 16/14 |
| 2018/0139621 | A1* | 5/2018 | Boudreau | G01S 7/021 |
| 2019/0335336 | A1 | 10/2019 | Cimpu et al. | |
| 2021/0105633 | A1* | 4/2021 | Vaidya | H04W 76/27 |
| 2022/0196790 | A1* | 6/2022 | Ottosson | G01S 7/023 |

FOREIGN PATENT DOCUMENTS

| | | |
|---|---|---|
| CN | 109196933 A | 1/2019 |
| EP | 1 505 772 A1 | 2/2005 |
| WO | 2017/171591 A1 | 10/2017 |

OTHER PUBLICATIONS

Draft ETSI EN 301 893 V2.0.7 (Nov. 2016); Harmonised European Standard; 5 Ghz RLAN; Harmonised Standard Covering the Essential Requirements of Article 3.2 f Directive 2014/53/EU, consisting of 123 pages.

Federal Communications Commission Office of Engineering and Technology Laboratory Division; Compliance Measurement Procedures For Unlicensed-National Information Infrastructure Devices Operating in the 5250-5350 MHz and 5470-5725 MHz Bands Incorporating Dynamic Frequency Selection; Apr. 8, 2016, consisting of 49 pages.

O-RAN Alliance; ORAN-WG4.CUS.0-v02.00; Technical Specification; O-RAN Fronthaul Working Group Control, User and Synchronization Plane Specification; Copyright 2019, consisting of 218 pages.

O-RAN Alliance; ORAN-WG4.MP.0-v02.00.00; Technical Specification; O-RAN Alliance Working Group 4 Management Plane Specification; Copyright 2019, consisting of 149 pages.

Chinese Office Action and summary English translation of the Chinese Office Action dated Jan. 25, 2025 issued in corresponding Chinese Application No. 202080101666.X, consisting of 12 pages.

\* cited by examiner

| Section Type 8: Radar Pulse and Waveform Notification, RU to DU | | | | | | | | # of bytes | |
|---|---|---|---|---|---|---|---|---|---|
| 0 (msb) | 1 | 2 | 3 | 4 | 5 | 6 | 7 (lsb) | | |
| reserved | | Payload version | | Transport Header | | | | 8 | Octet 1 |
| Frame ID | | | | | | reserved | | 1 | Octet 9 |
| Subframe ID | | | | Slot ID | | | | 1 | Octet 10 |
| Slot ID | | | | reserved | | | | 1 | Octet 11 |
| Section Type = 8 | | | | | | | | 1 | Octet 12 |
| reserved | | | | | | | | 1 | Octet 13 |
| reserved | | | | | | | | 1 | Octet 14 |
| reserved | | | | | | | | 1 | Octet 15 |
| reserved | | | | | | | | 1 | Octet 16 |
| RadarMsgType | | | | RadarMsgLen | | | | 1 | Octet 17 |
| Payload (plus padding to 32-bit boundary) | | | | | | | | 3 or 7 | Octet 18+ |

FIG. 6

RADAR METADATA IN FRONTHAUL MANAGEMENT PLANE SIGNALING

CROSS-REFERENCE TO RELATED APPLICATIONS

This application is a Submission Under 35 U.S.C. § 371 for U.S. National Stage Patent Application of International Application Number: PCT/IB2020/055201, filed Jun. 2, 2020 entitled "RADAR METADATA IN FRONTHAUL MANAGEMENT PLANE SIGNALING," the entirety of which is incorporated herein by reference.

TECHNICAL FIELD

The present disclosure relates to wireless communications, and in particular, to radar metadata in fronthaul control and/or management plane signaling.

BACKGROUND

Demands on wireless equipment and networks continues to increase. Wireless operation may be in a spectrum that requires detection of radar transmissions, e.g., 5250 Megahertz (MHz) to 5730 MHz Federal Communications Commission (FCC) Unlicensed National Information Infrastructure (U-NII 2) band in the United States of America (USA), or 5250 MHz-5350 MHz and 5470 MHz-5725 MHz when operating in Europe. Radar detection requirements are commonly known as Dynamic Frequency Selection (DFS). For example, in the 5 GHz unlicensed band, the frequency bands from 5250 to 5730 MHz fall within the UNII-2 and UNII-2 extension band and are subject to radar monitoring. The requirements for detecting the required radar signals and ceasing transmission in the unlicensed bands are specified by the FCC in the USA. Similar requirements are present in European standards for 5 GHz radio local area network (RLAN) operation. Many products (e.g., Wi-Fi, Third Generation Partnership Project (3GPP) Long Term Evolution License Assisted Access (LTE-LAA)) already support DFS functionality in order to use the DFS spectrum since it is a relatively interference free spectrum. Upcoming 3GPP New Radio Unlicensed (NR-U) devices may also use the DFS spectrum.

Radio access network (RAN) architectures may employ a fronthaul interface between the Digital Unit (DU) and Radio Unit (RU) where the fronthaul interface maybe based on, e.g., common public radio interface (CPRI), enhanced CPRI (eCPRI), Open RAN (ORAN) Lower Layer Split (LLS) or another proprietary protocol such that some functions of the Physical Layer, e.g., Open Systems Interconnection physical layer, processing are executed within the RU (the lower physical layer, also called the lower PHY) while upper physical layer functions are executed in the DU.

Fronthaul between the DU and RU may utilize an interface specification describing the control plane, user plane and management plane signaling procedures and message structures exchanged between fronthaul interface endpoints, e.g., DU and RU. An example of such an interface specification is being developed by the ORAN open fronthaul interface workgroup (WG4).

However, existing arrangements for radar monitoring are inefficient.

SUMMARY

Some embodiments advantageously provide a method and system for radar metadata in fronthaul control and/or management plane signaling.

According to one aspect of the present disclosure, a method implemented in a radio unit, RU, network node is provided. The method includes detecting a radar signal; and based at least in part on the detection, sending a message to one of a digital unit, DU, network node and a management network node, the message comprising information about the detected radar signal.

In some embodiments of this aspect, detecting the radar signal further includes detecting the radar signal within a frequency spectrum in which radar signals co-exist with Radio Access Network, RAN, signals. In some embodiments of this aspect, sending the message further includes sending the message to the DU network node via a fronthaul control plane interface. In some embodiments of this aspect, sending the message further includes sending the message to the management network node via a fronthaul management plane interface. In some embodiments of this aspect, the information about the detected radar signal comprises radar pulse metadata.

In some embodiments of this aspect, the radar pulse metadata includes at least one of a pulse peak power, a pulse center frequency, a pulse width in frequency, a pulse width in time, a pulse timestamp and a pulse chirp. In some embodiments of this aspect, the information about the detected radar signal comprises radar waveform metadata. In some embodiments of this aspect, the radar waveform metadata includes at least one of a radar waveform type, a number of pulses detected, at least one timestamp associated with the radar waveform and at least one detection interruption indicator. In some embodiments of this aspect, the method further includes comparing the detected radar signal to at least one predetermined radar waveform characteristic; and determining whether the detected radar signal matches the at least one predetermined radar waveform characteristic.

In some embodiments of this aspect, when the detected radar signal matches the at least one predetermined radar waveform characteristic, the message includes radar waveform metadata. In some embodiments of this aspect, the method further includes receiving information indicating the at least one predetermined radar waveform characteristic from at least one of the management network node and the DU network node. In some embodiments of this aspect, the RU network node is a remote radio head network node and the DU network node is a baseband processing node of a Radio Access Network, RAN, base station.

According to another aspect of the present disclosure, a method implemented in a network node is provided. The method includes receiving a message from a radio unit, RU, network node, the message comprising information about a radar signal detected by the RU network node; and as a result of the received message, performing an operational task.

In some embodiments of this aspect, the radar signal is detected within a frequency spectrum in which radar signals co-exist with Radio Access Network, RAN, signals. In some embodiments of this aspect, the network node is a digital unit, DU, network node and the receiving the message further comprises receiving the message via a fronthaul control plane interface. In some embodiments of this aspect, the network node is a management network node and the receiving the message further comprises receiving the message via a fronthaul management plane interface. In some embodiments of this aspect, the information about the detected radar signal comprises radar pulse metadata.

In some embodiments of this aspect, the radar pulse metadata includes at least one of a pulse peak power, a pulse center frequency, a pulse width in frequency, a pulse width in time, a pulse timestamp and a pulse chirp. In some embodiments of this aspect, the information about the detected radar signal comprises radar waveform metadata. In some embodiments of this aspect, the radar waveform metadata includes at least one of a radar waveform type, a number of pulses detected, at least one timestamp associated with the radar waveform and at least one detection interruption indicator. In some embodiments of this aspect, the method further includes sending information indicating at least one predetermined radar waveform characteristic to the RU network node. In some embodiments of this aspect, performing the operational task includes as a result of the received message, using the information in the message to determine whether the detected radar signal corresponds to a matching radar waveform.

In some embodiments of this aspect, performing the operational task comprises, as a result of the received message, at least one of: determining to stop transmitting RAN signals within the frequency spectrum in which the RAN signals co-exist with radar; and switching to another frequency spectrum not co-existing with radar.

According to another aspect of the present disclosure, a radio unit, RU, network node is provided. The RU network node includes processing circuitry. The processing circuitry is configured to cause the RU network node to detect a radar signal; and based at least in part on the detection, send a message to one of a digital unit, DU, network node and a management network node, the message comprising information about the detected radar signal.

In some embodiments of this aspect, the processing circuitry is configured to cause the RU network node to detect the radar signal by being configured to cause the RU network node to detect the radar signal within a frequency spectrum in which radar signals co-exist with Radio Access Network, RAN, signals. In some embodiments of this aspect, the processing circuitry is configured to cause the RU network node to send the message by being configured to cause the RU network node to send the message to the DU network node via a fronthaul control plane interface. In some embodiments of this aspect, the processing circuitry is configured to cause the RU network node to send the message by being configured to cause the RU network node to send the message to the management network node via a fronthaul management plane interface.

In some embodiments of this aspect, the information about the detected radar signal comprises radar pulse metadata. In some embodiments of this aspect, the radar pulse metadata includes at least one of a pulse peak power, a pulse center frequency, a pulse width in frequency, a pulse width in time, a pulse timestamp and a pulse chirp. In some embodiments of this aspect, the information about the detected radar signal comprises radar waveform metadata. In some embodiments of this aspect, the radar waveform metadata includes at least one of a radar waveform type, a number of pulses detected, at least one timestamp associated with the radar waveform and at least one detection interruption indicator.

In some embodiments of this aspect, the processing circuitry is configured to cause the RU network node to: compare the detected radar signal to at least one predetermined radar waveform characteristic; and determine whether the detected radar signal matches the at least one predetermined radar waveform characteristic. In some embodiments of this aspect, when the detected radar signal matches the at least one predetermined radar waveform characteristic, the message includes radar waveform metadata. In some embodiments of this aspect, the processing circuitry is configured to cause the RU network node to receive information indicating the at least one predetermined radar waveform characteristic from at least one of the management network node and the DU network node. In some embodiments of this aspect, the RU network node is a remote radio head node and the DU network node is a baseband processing node of a Radio Access Network, RAN, base station.

According to yet another aspect of the present disclosure, a network node is provided. The network node includes processing circuitry. The processing circuitry is configured to cause the network node to receive a message from a radio unit, RU, network node, the message comprising information about a radar signal detected by the RU network node; and as a result of the received message, perform an operational task.

In some embodiments of this aspect, the radar signal is detected within a frequency spectrum in which radar signals co-exist with Radio Access Network, RAN, signals. In some embodiments of this aspect, the network node is a digital unit, DU, network node and the processing circuitry is configured to cause the network node to receive the message by being further configured to cause the network node to receive the message via a fronthaul control plane interface. In some embodiments of this aspect, the network node is a management network node and the processing circuitry is configured to cause the network node to receive the message by being further configured to cause the network node to receive the message via a fronthaul management plane interface. In some embodiments of this aspect, the information about the detected radar signal comprises radar pulse metadata. In some embodiments of this aspect, the radar pulse metadata includes at least one of a pulse peak power, a pulse center frequency, a pulse width in frequency, a pulse width in time, a pulse timestamp and a pulse chirp.

In some embodiments of this aspect, the information about the detected radar signal comprises radar waveform metadata. In some embodiments of this aspect, the radar waveform metadata includes at least one of a radar waveform type, a number of pulses detected, at least one timestamp associated with the radar waveform and at least one detection interruption indicator. In some embodiments of this aspect, the processing circuitry is configured to cause the network node to send information indicating at least one predetermined radar waveform characteristic to the RU network node.

In some embodiments of this aspect, the processing circuitry is configured to cause the network node to perform the operational task by being configured to cause the network node to, as a result of the received message, use the information in the message to determine whether the detected radar signal corresponds to a matching radar waveform. In some embodiments of this aspect, the processing circuitry is configured to cause the network node to perform the operational task by being configured to cause the network node to: as a result of the received message, at least one of: determine to stop transmitting RAN signals within the frequency spectrum in which the RAN signals co-exist with radar; and switch to another frequency spectrum not co-existing with radar.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 shows an example section type message according to some embodiments of the present disclosure.

DETAILED DESCRIPTION

Figure 1:
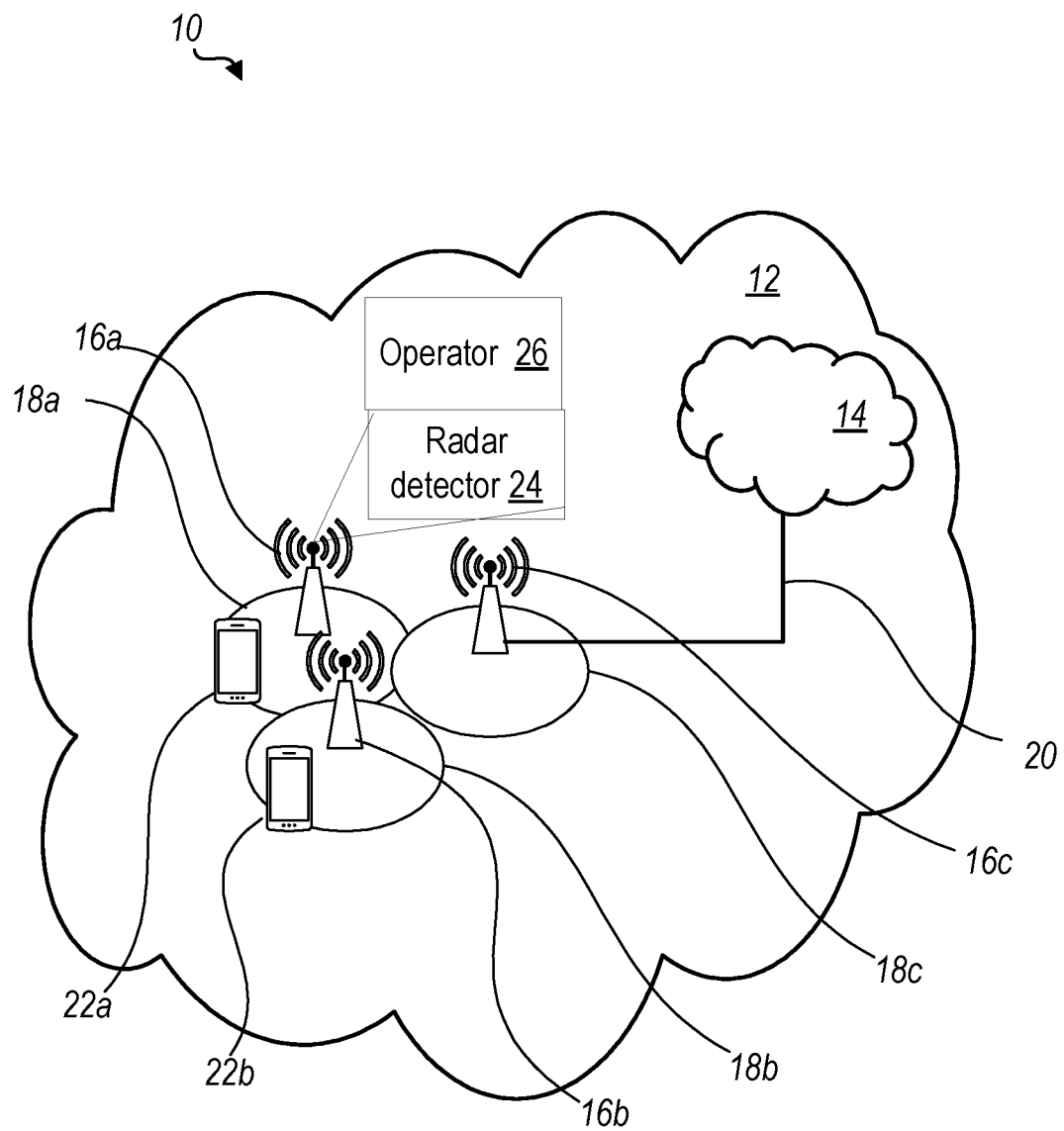
FIG. 1 is a schematic diagram of an example network architecture illustrating a communication system according to the principles in the present disclosure.

Traditionally, transmitters that operate in the DFS spectrum perform radar detection in the DU lower PHY function. For example:

First, the RU performs reception of analogue radio frequency (RF), converts this to digital format using an Analogue-to-Digital Convertor (ADC).

Second, the RU sends the digital uplink (UL) user-plane data stream to the DU for processing and demodulation in the lower PHY function. This data stream is known as IQ data in fronthaul interfaces such as CPRI, eCPRI and ORAN LLS.

Third, the lower PHY function uses algorithms to search for radar pulse signatures. These signatures may be based on received RF power, pulse width in frequency and time and/or pulse frequency change (chirp).

Forth, once a possible radar pulse has been identified the next step is to match the pulse to a known radar waveform (pattern). This may be performed by matching received pulses to radar waveform pulse intervals, pulse repetitions and pulse patterns.

A radar pulse is a discreet pulse of RF energy in time and frequency. A radar waveform is a set of pulses with a specific pattern and timing, i.e. repetition of pulses.

Using the traditional method described above, all user-plane uplink (UL) IQ data is sent from the RU to the DU for radar detection processing. The IQ stream is sent even if there are no wireless devices (e.g., user equipments or UEs) transmitting UL data or even if there is no UL associated with the carrier (as in the case with DL-Only LTE-LAA).

It is noted that the user-plane IQ data stream may consume a large bandwidth on the fronthaul interface. Dimensioning the fronthaul interface bandwidth (bps) is a key part of network planning. Fronthaul network bandwidth is an expensive resource for network operators. Reducing the bandwidth requirements is highly valuable. It is also noted that actual radar transmissions are quite rare. This may imply that a lot of UL fronthaul bandwidth is wasted sending UL user plane IQ data from the RU to the DU where radar detection is performed but no radar transmissions are actually detected.

Some embodiments of the present disclosure propose an approach to perform all or parts of radar transmission detection in the RU and only send notifications and/or radar pulse metadata to the DU for further processing, which may utilize significantly less fronthaul bandwidth than traditional methods.

Some embodiments of the present disclosure may be applicable to 3GPP LTE-LAA and NR-Unlicensed (NR-U) and other RLAN technologies that operate in unlicensed spectrum, e.g., Institute of Electrical and Electronics Engineers (IEEE) 802.11 Wi-Fi and proprietary derivatives. For example, LTE-LAA products (and in the future NR-U products) that are deployed using a CPRI fronthaul interface and utilize DFS spectrum may benefit from the techniques disclosed herein. Other types of products that perform radar monitoring/detection may also benefit from the techniques disclosed herein.

Some embodiments of the present disclosure provide arrangements for RUs that execute physical layer functions and utilize CPRI, eCPRI, ORAN LLS or variants for the fronthaul interface to the DU. Such arrangements may include the fronthaul interface control plane protocol being enhanced to include radar pulse metadata and radar transmission notifications. For example, in some embodiments, radar pulse metadata may include pulse characteristics such as:

Pulse power peaks (absolute);
Pulse width in frequency (e.g. Hz);
Pulse width in time (e.g. nanoseconds);
Pulse timestamp (absolute time or relative to a radio frame or subframe); and/or
Pulse chirp (frequency variance characteristics).

In some embodiments, such metadata may utilize only a few tens of bytes of signaling over the fronthaul interface and may only be sent when a pulse has been detected—far, far less than the raw IQ data. Some embodiments may allow the RU to cease UL fronthaul IQ data transmission when no pulse or user plane IQ data is present.

The control plane UL signaling may be near real-time, which may be useful since regulatory requirements generally require that once a radar transmission has been detected, all transmissions by the detecting RU are to be stopped within approximately 200 milliseconds (ms). This period is termed "Channel Closing Transmission Time".

In some embodiments, the DU can then perform the final analysis of the received pulse metadata signals, such as, matching the pulse metadata to a known radar waveform (pattern). This may be performed by matching pulses to radar waveform pulse patterns, i.e., pulse intervals, pulse repetitions and pulse patterns. The DU radar detection function may then determine that a pulse or set of pulses are or are not from an actual radar transmission and take appropriate action.

Alternatively, some embodiments may provide for the final pulse analysis to also be performed in the RU, where the RU sends radar waveform metadata to the DU, e.g., radar waveform X has been detected at time T, where X refers to a radar waveform described and the DU radar function can take appropriate action for the detected radar waveform.

In addition, in some embodiments, the fronthaul management plane interface may be extended so that the DU can include radar pulse and radar waveform characteristics to be detected by the RU. This may allow the RU to be dynamically configured with radar pulse and waveform characteristics that the RU may then use in the pulse detection and/or radar waveform detection functions. For example, if the FCC introduced a new radar waveform that is required to be detected, the RU software may receive the radar pulse and/or waveform characteristics of the new radar waveform from the DU. Such pulse characteristics may include measurement margins for pulse width, repetition and chirp widths, number of pulses in a radar waveform, etc.

Some embodiments of the present disclosure may advantageously provide for reduced fronthaul link/fronthaul network UL bandwidth requirements. This may be especially beneficial in deployments where the unlicensed DFS spectrum is used for downlink (DL) only mode, for example with LTE-LAA or NR-Unlicensed DL-Only Carrier Aggregation (CA).

Some embodiments of the present disclosure may advantageously provide for reduced processing in the DU since radar pulse and/or radar waveform detection may be moved to the RU, which may be especially beneficial in the baseband on commercial off-the-shelf (COTS) DU architecture.

Some embodiments of the present disclosure may advantageously allow new radar pulse and waveforms to be detected by the RU without the radar detection function being upgraded with new software in the RU.

Some embodiments of the present disclosure may advantageously enhance open fronthaul standards, such as, for example, ORAN.

Before describing in detail exemplary embodiments, it is noted that the embodiments reside primarily in combinations of apparatus components and processing steps related to radar metadata in fronthaul control and/or management plane signaling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of digital unit (DU) network node, radio unit (RU) network node, a management system network node, base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB, relay node, access point, radio access point, Remote Radio Unit (RRU) Remote Radio Head (RRH).

In some embodiments, the term "fronthaul" is used and may refer to a part of a network and/or an interface that connects digital units (e.g., baseband units) to radio units (e.g., RRHs). A fronthaul interface may be based on e.g., CPRI, eCPRI, ORAN Lower Layer Split (LLS) or another proprietary protocol. For example, a fronthaul control plane interface may be an ORAN Lower Layer Split or a proprietary Common Public Radio Interface (CPRI).

In some embodiments, the term uplink (UL) message is used and may indicate a message from the RU network node to the DU network node or management network node via a fronthaul interface. In some embodiments, the term downlink (DL) message is used and may indicate a message from the DU network node or management network node to the RU network node via a fronthaul interface.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide for radar metadata in fronthaul control and/or management plane signaling.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. It is also contemplated that one or more network nodes, e.g., network node 16a and network node 16b can be combined and included in or form parts of a single network node 16. For example, in some embodiments, network node 16a may be a RU network node and network node 16b may be a DU network node, in which the RU and DU network nodes are parts of a gNB.

A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 (e.g., radio unit) is configured to include a radar detector 24 which is configured to detect a radar signal; and based at least in part on the detection, send a message to one of a digital unit, DU, network node and a management network node, the message comprising information about the detected radar signal.

A network node 16 (e.g., digital unit or management node) is configured to include an operator 26 which is configured to receive a message from a radio unit, RU, network node, the message comprising information about a radar signal detected by the RU network node; and as a result of the received message, perform an operational task.

Example implementations, in accordance with an embodiment, of the WD 22 and network node 16 discussed in the preceding paragraphs will now be described with reference to FIG. 2.

The communication system 10 further includes a network node 16 provided in a communication system 10 and including hardware 27 enabling it to communicate with the WD 22. The hardware 27 may include a communication interface 28 for setting up and maintaining a wired or wireless connection with an interface of a different communication device of the communication system 10, as well as a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers.

In the embodiment shown, the hardware 27 of the network node 16 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 38, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 40 stored internally in, for example, memory 38, or stored in external memory (e.g., database, storage array, network storage device, etc.) accessible by the network node 16 via an external connection. The software 40 may be executable by the processing circuitry 34. The processing circuitry 34 may be configured to control any of the methods and/or processes described herein and/or to cause such methods, and/or processes to be performed, e.g., by network node 16. Processor 36 corresponds to one or more processors 36 for performing network node 16 functions described herein. The memory 38 is configured to store data, programmatic software code and/or other information described herein. In some embodiments, the software 40 may include instructions that, when executed by the processor 36 and/or processing circuitry 34, causes the processor 36 and/or processing circuitry 34 to perform the processes described herein with respect to network node 16. For example, processing circuitry 34 of the network node 16 may include radar detector 24 configured to perform network node methods discussed herein, such as the methods discussed with reference to FIG. 3 well as other figures.

In some embodiments, the communication system 10 may include an interface 41, such as a fronthaul interface (e.g., fronthaul control plane and/or management plane interface) between two network nodes, such as, between network node 16a (e.g., radio unit) and network node 16b (e.g., digital unit or management node). In some embodiments, the communication interface 28 may be configured to allow the network nodes 16a, 16b to communicate via the interface 41.

In some embodiments, the network node 16a may be configured as a radio unit network node and may include the radar detector 24. In some embodiments, the network node 16b may be configured as a digital unit or management network node and may include operator 26. The operator 26 may be configured to perform network node methods discussed herein, such as the methods discussed with reference to FIG. 4 as well as other figures.

Figure 2:
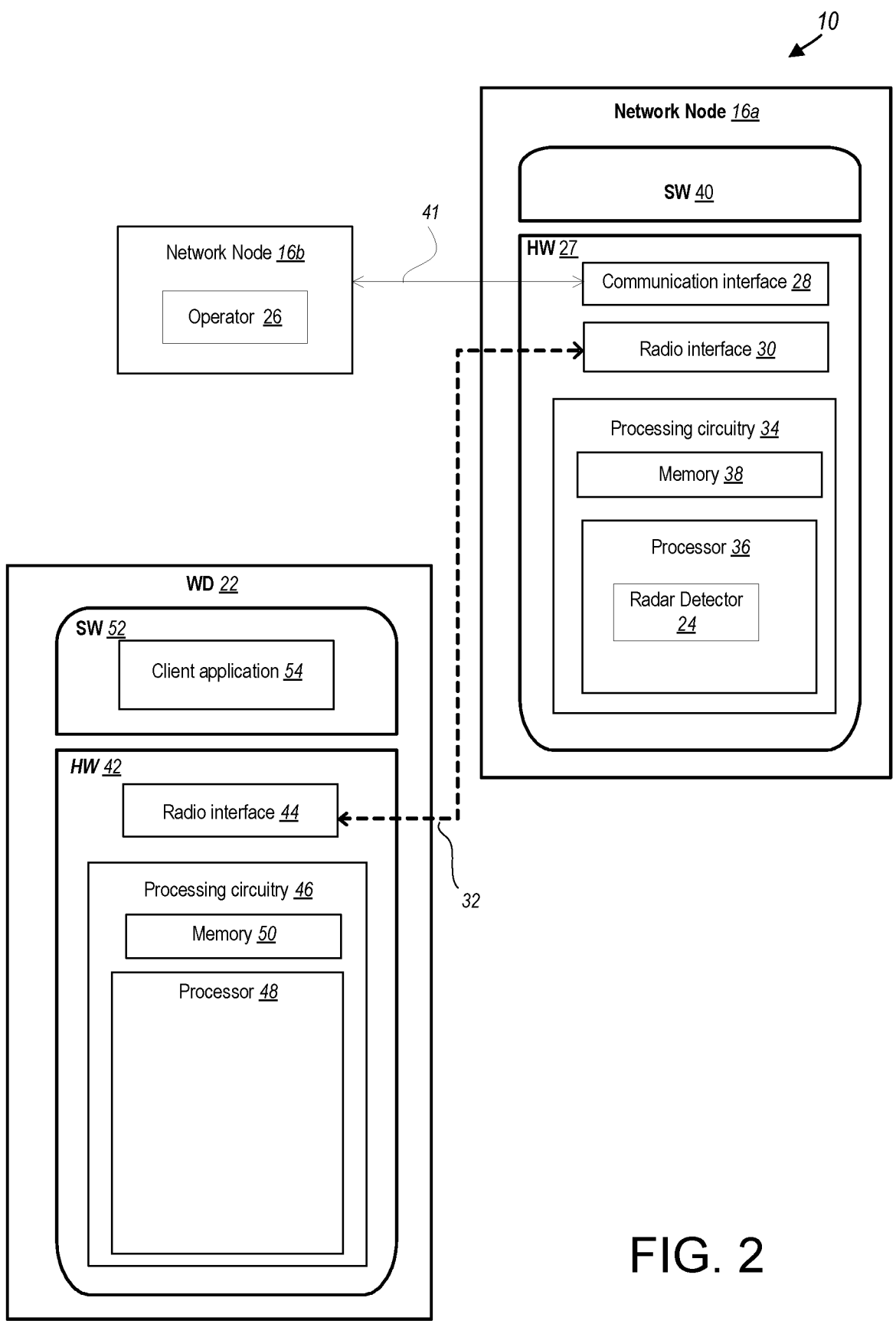
FIG. 2 is a block diagram of a network node in communication with a wireless device over an at least partially wireless connection according to some embodiments of the present disclosure.

It is noted that the hardware 27 (communication interface 28, radio interface 30, processor 36, processing circuitry 34, memory 38) and software 40 are shown in network node 16a in FIG. 2; however, network node 16b may also include one or more or all of such components as well (not shown for brevity).

The communication system 10 further includes the WD 22 already referred to. The WD 22 may have hardware 42 that may include a radio interface 44 configured to set up and maintain a wireless connection 32 with a network node 16 serving a coverage area 18 in which the WD 22 is currently located. The radio interface 44 may be formed as or may include, for example, one or more RF transmitters, one or more RF receivers, and/or one or more RF transceivers.

The hardware 42 of the WD 22 further includes processing circuitry 46. The processing circuitry 46 may include a processor 48 and memory 50. In particular, in addition to or instead of a processor, such as a central processing unit, and memory, the processing circuitry 46 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 48 may be configured to access (e.g., write to and/or read from) memory 50, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 52, which is stored in, for example, memory 50 at the WD 22, or stored in external memory (e.g., database, storage array, network storage device, etc.) accessible by the WD 22. The software 52 may be executable by the processing circuitry 46. The software 52 may include a client application 54. The client application 54 may be operable to provide a service to a human or non-human user via the WD 22. The client application 54 may interact with the user to generate the user data that it provides.

The processing circuitry 46 may be configured to control any of the methods and/or processes described herein and/or to cause such methods, and/or processes to be performed, e.g., by WD 22. The processor 48 corresponds to one or more processors 48 for performing WD 22 functions described herein. The WD 22 includes memory 50 that is configured to store data, programmatic software code and/or other information described herein. In some embodiments, the software 52 and/or the client application 54 may include instructions that, when executed by the processor 48 and/or processing circuitry 46, causes the processor 48 and/or processing circuitry 46 to perform the processes described herein with respect to WD 22.

In some embodiments, the inner workings of the network node 16 and WD 22, may be as shown in FIG. 2 and independently, the surrounding network topology may be that of FIG. 1.

Although FIGS. 1 and 2 show various units such as radar detector 24 and operator 26 as being within a processor, it is contemplated that these units may be implemented such that a portion of the unit is stored in a corresponding memory within the processing circuitry. In other words, the units may be implemented in hardware or in a combination of hardware and software within the processing circuitry.

Figure 3:
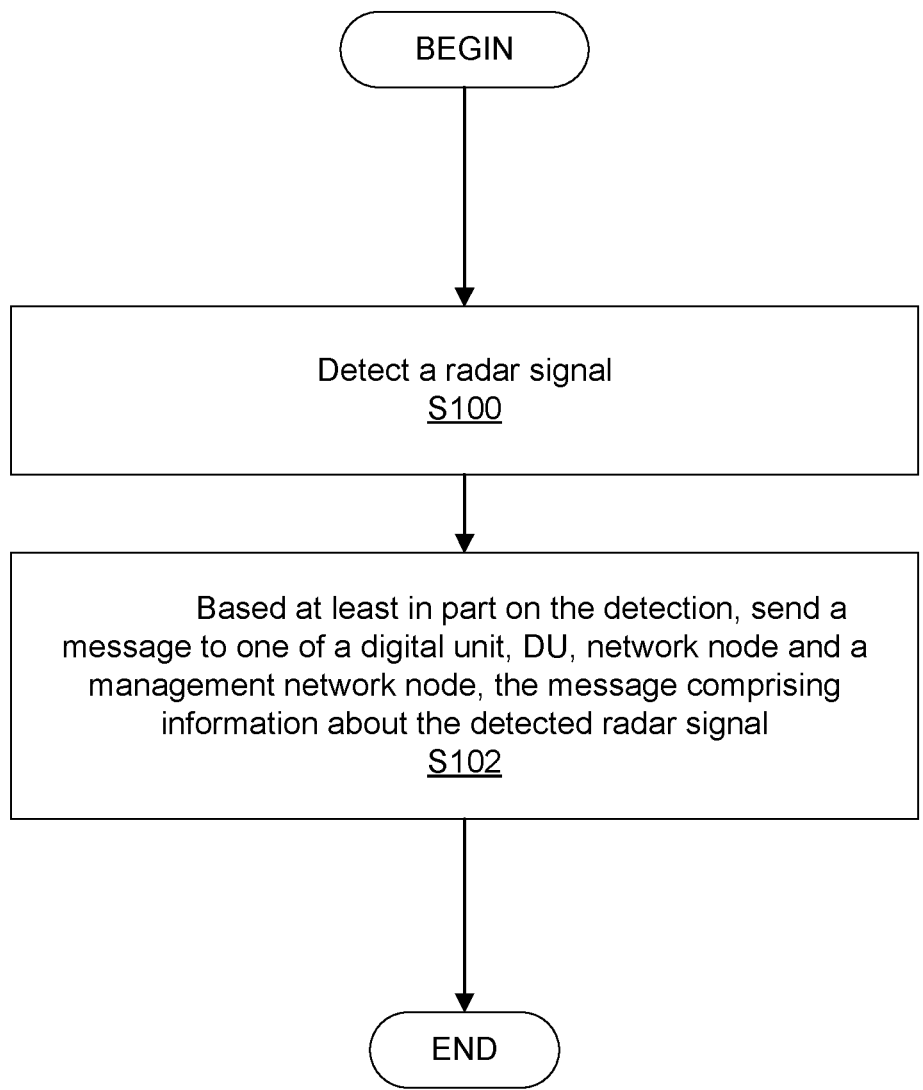
FIG. 3 is a flowchart of an example process in a network node for a radar detector according to some embodiments of the present disclosure.

FIG. 3 is a flowchart of an example process in a network node 16 (that may be configured as a radio unit (RU) network node) according to some embodiments of the present disclosure. One or more Blocks and/or functions and/or methods performed by the network node 16 may be performed by one or more elements of network node 16 such as by radar detector 24 in processing circuitry 34, processor 36, memory 38, communication interface 28, radio interface 30, etc. according to the example method. The example method includes detecting (Block S100), such as via radar detector 24, processing circuitry 34, processor 36, memory 38, communication interface 28 and/or radio interface 30, a radar signal. The method includes based at least in part on the detection, sending (Block S102), such as via radar detector 24, processing circuitry 34, processor 36, memory 38, communication interface 28 and/or radio interface 30, a message to one of a digital unit, DU, network node and a management network node, the message comprising information about the detected radar signal.

In some embodiments, detecting the radar signal further includes detecting, such as via radar detector 24, processing circuitry 34, processor 36, memory 38, communication interface 28 and/or radio interface 30, the radar signal within a frequency spectrum in which radar signals co-exist with Radio Access Network, RAN, signals. In some embodiments, sending the message further includes sending, such as via radar detector 24, processing circuitry 34, processor 36, memory 38, communication interface 28 and/or radio interface 30, the message to the DU network node via a fronthaul control plane interface. In some embodiments, sending the message further includes sending, such as via radar detector 24, processing circuitry 34, processor 36, memory 38, communication interface 28 and/or radio interface 30, the message to the management network node via a fronthaul management plane interface.

In some embodiments, the information about the detected radar signal comprises radar pulse metadata. In some embodiments, the radar pulse metadata includes at least one of a pulse peak power, a pulse center frequency, a pulse width in frequency, a pulse width in time, a pulse timestamp and a pulse chirp. In some embodiments, the information about the detected radar signal comprises radar waveform metadata.

In some embodiments, the radar waveform metadata includes at least one of a radar waveform type, a number of pulses detected, at least one timestamp associated with the radar waveform and at least one detection interruption indicator. In some embodiments, the method further includes comparing, such as via radar detector 24, processing circuitry 34, processor 36, memory 38, communication interface 28 and/or radio interface 30, the detected radar signal to at least one predetermined radar waveform characteristic; and determining, such as via radar detector 24, processing circuitry 34, processor 36, memory 38, communication interface 28 and/or radio interface 30, whether the detected radar signal matches the at least one predetermined radar waveform characteristic.

In some embodiments, when the detected radar signal matches the at least one predetermined radar waveform characteristic, the message includes radar waveform metadata. In some embodiments, the method further includes receiving, such as via radar detector 24, processing circuitry 34, processor 36, memory 38, communication interface 28 and/or radio interface 30, information indicating the at least one predetermined radar waveform characteristic from at least one of the management network node and the DU network node. In some embodiments, the RU network node is a remote radio head network node and the DU network node is a baseband processing node of a Radio Access Network, RAN, base station.

Figure 4:
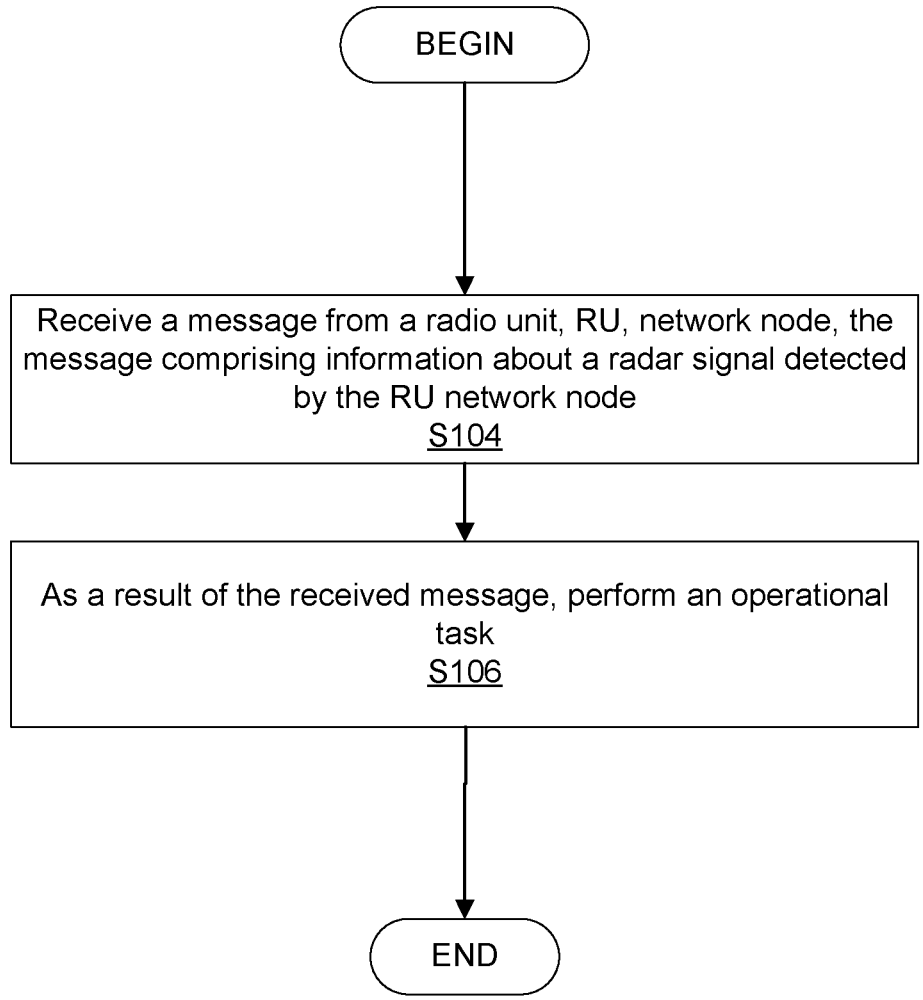
FIG. 4 is a flowchart of an example process in a network node for operator according to some embodiments of the present disclosure.

FIG. 4 is a flowchart of an example process in a network node 16 (that may be configured as a digital unit (DU) network node) according to some embodiments of the present disclosure. One or more Blocks and/or functions and/or methods performed by the network node 16 may be performed by one or more elements of network node 16 such as by operator 26 in processing circuitry 34, processor 36, memory 38, communication interface 28, radio interface 30, etc. according to the example method. The example method includes receiving (Block S104), such as via operator 26, processing circuitry 34, processor 36, memory 38, communication interface 28 and/or radio interface 30, a message from a radio unit, RU, network node, the message comprising information about a radar signal detected by the RU network node. The method includes as a result of the received message, performing (Block S106), such as via operator 26, processing circuitry 34, processor 36, memory 38, communication interface 28 and/or radio interface 30, an operational task.

In some embodiments, the radar signal is detected within a frequency spectrum in which radar signals co-exist with Radio Access Network, RAN, signals. In some embodiments, the network node is a digital unit, DU, network node and the receiving the message further comprises receiving, such as via operator 26, processing circuitry 34, processor 36, memory 38, communication interface 28 and/or radio interface 30, the message via a fronthaul control plane interface. In some embodiments, the network node 16 is a management network node and the receiving the message further comprises receiving, such as via operator 26, processing circuitry 34, processor 36, memory 38, communication interface 28 and/or radio interface 30, the message via a fronthaul management plane interface.

In some embodiments, the information about the detected radar signal comprises radar pulse metadata. In some embodiments, the radar pulse metadata includes at least one of a pulse peak power, a pulse center frequency, a pulse width in frequency, a pulse width in time, a pulse timestamp and a pulse chirp. In some embodiments, the information about the detected radar signal comprises radar waveform metadata. In some embodiments, the radar waveform metadata includes at least one of a radar waveform type, a number of pulses detected, at least one timestamp associated with the radar waveform and at least one detection interruption indicator. In some embodiments, the method further includes sending, such as via operator 26, processing circuitry 34, processor 36, memory 38, communication interface 28 and/or radio interface 30, information indicating at least one predetermined radar waveform characteristic to the RU network node.

In some embodiments, performing the operational task comprises as a result of the received message, using, such as via operator 26, processing circuitry 34, processor 36, memory 38, communication interface 28 and/or radio interface 30, the information in the message to determine whether the detected radar signal corresponds to a matching radar waveform. In some embodiments, performing the operational task comprises as a result of the received message, at least one of: determining, such as via operator 26, processing circuitry 34, processor 36, memory 38, communication interface 28 and/or radio interface 30, to stop transmitting RAN signals within the frequency spectrum in which the RAN signals co-exist with radar; and switching, such as via operator 26, processing circuitry 34, processor 36, memory 38, communication interface 28 and/or radio interface 30, to another frequency spectrum not co-existing with radar.

Having described the general process flow of arrangements of the disclosure and having provided examples of hardware and software arrangements for implementing the processes and functions of the disclosure, the sections below provide details and examples of arrangements for radar metadata in fronthaul control and/or management plane signaling, which may be implemented by the network node 16 and/or wireless device 22.

Note that although terminology from one particular wireless system specification, such as, for example, ORAN, may be used to describe the examples below, this should not be seen as limiting the scope of the disclosure to only the example systems described. Other wireless systems and specifications may also benefit from exploiting the ideas covered within this disclosure.

Figure 5:
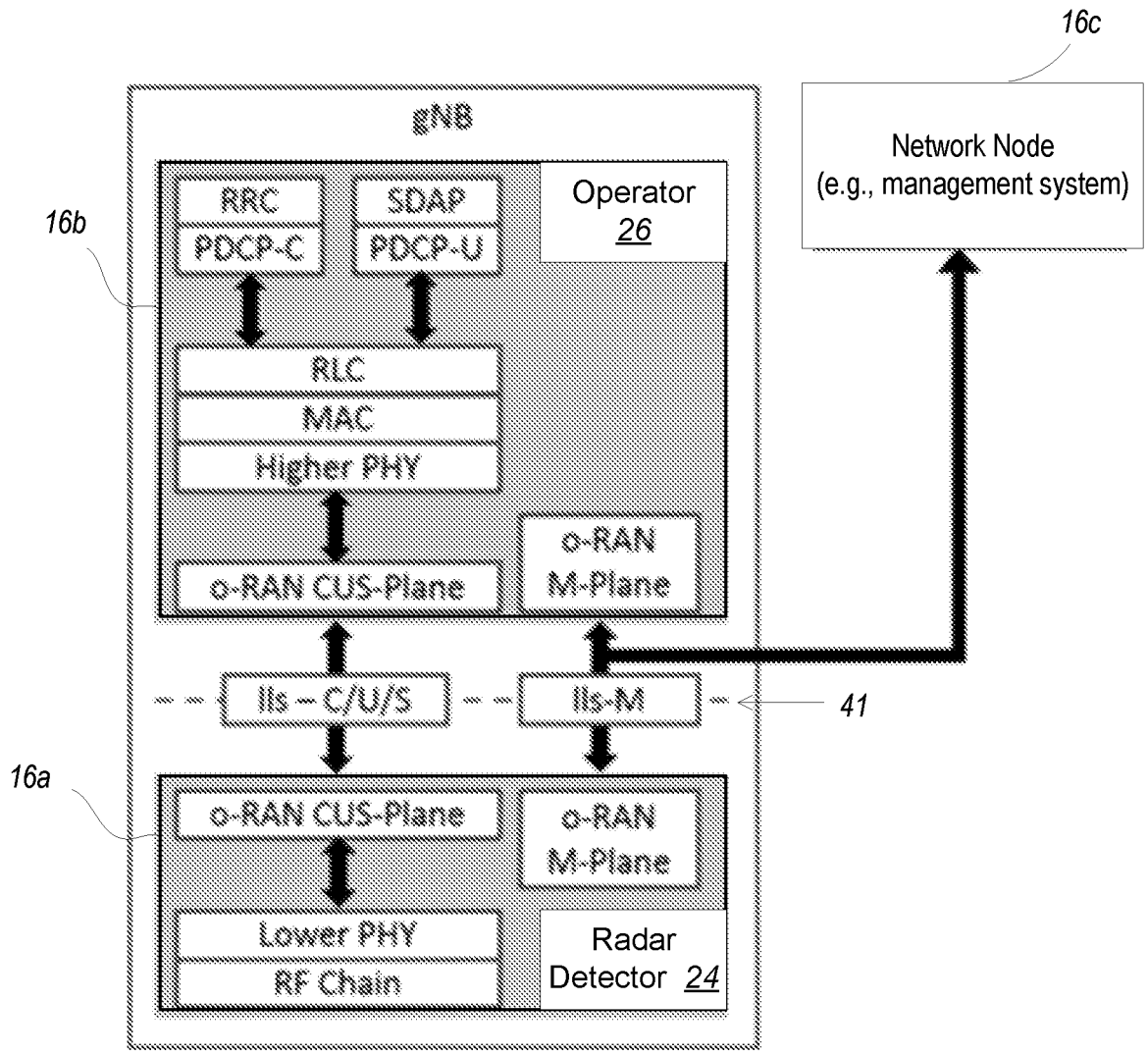
FIG. 5 shows an example of split of functions between a digital unit (DU) and a radio unit (RU) and the fronthaul interfaces that are involved in some embodiments of the present disclosure.

FIG. 5 shows an example of the split of functions, e.g., ORAN LLS, between a DU network node 16b (e.g., O-DU in ORAN specifications) and a RU network node 16a (e.g., O-RU in ORAN specifications) of a gNB, and the interfaces 41, e.g., fronthaul interfaces, that may be involved in some embodiments of the present disclosure. As can been seen in the example shown in FIG. 5, the DU network node 16b may include the following functions: radio resource control (RRC), packet data convergence protocol control plane (PDCP-C), PDCP user plane (PDCP-U), service data adaption protocol (SDAP), radio link control (RLC), medium access control (MAC), higher physical layer (higher PHY), ORAN Control, User and Synchronization plane (ORAN CUS plane) and ORAN management plane (ORAN M-Plane) functions. Some embodiments of the DU network node 16b may further include the operator 26 discussed above, which may be configured to e.g., receive a message comprising information about a radar signal detected by the RU network node 16a; and as a result of the received message, perform an operational task.

As can be seen in the example shown in FIG. 5, the RU network node 16a may include the following functions: ORAN CUS plane, ORAN M-Plane, lower physical layer (lower PHY) and radio frequency (RF) chain. Some embodiments of the RU network node 16a may further include the radar detector 24 discussed above, which may be configured to e.g., detect a radar signal; and based at least in part on the detection, send a message to one of the DU network node 16b and the management network node 16c, the message comprising information about the detected radar signal.

Metadata Signaling

Some embodiments may define fronthaul signaling structures for pulse metadata and radar metadata information elements. In some embodiments, these fronthaul signaling structures may be fronthaul signaling structures sent from the RU network node 16a to the DU network node 16b or the management network node 16c over the interface 41, which may include a fronthaul control plane interface (labelled "lls—C/U/S" in FIG. 5) and a fronthaul management plane interface (labelled "lls-M" in FIG. 5).

In some embodiments, the pulse metadata and/or radar metadata may be sent over the fronthaul control plane interface. In some embodiments, the pulse metadata and/or radar metadata may be sent over the fronthaul management plane interface.

In one embodiment, a new section type may be used to carry pulse and/or radar metadata and notifications from the RU network node 16a to the DU network node 16b or the management network node 16c. Using the ORAN CUS Specification as a non-limiting illustrative example, the following section types may be defined in Table 1 below:

Note that frame ID, subframe ID and slot IDs may serve to provide a time stamp on the radar pulse and waveform notification control/management plane message and do not describe any user plane data associated with the section type 8 control/management plane message.

In one embodiment, the radar pulse and waveform notification section type value defines a RadarMsgType field and RadarMsgLen field. The number of bits used for each field in FIG. 6 are non-limiting examples.

The RadarMsgType field can be used to identify the structure of the payload for specific notifications. For example, a RadarMsgType can be defined to describe pulse metadata in the payload while a different RadarMsgType can be defined to describe radar waveform metadata in the payload. For example, a value of 0 in the RadarMsgType field may indicate a pulse metadata payload structure and a

TABLE 1

Section Types.

| Section Type | Target Scenario | Remarks |
| --- | --- | --- |
| 0 | Unused resource blocks or symbols in Downlink (DL) or Uplink (UL) | Indicates to O-RU that certain resource blocks or symbols will not be used (idle periods, guard periods). Likewise, there are no associated U-Plane messages containing IQ data for this Section Type. The purpose is to inform the O-RU that transmissions may be halted during the specified idle interval for e.g., power savings or to provide an interval for calibration. |
| 1 | Most DL/UL radio channels | Here "most" refers to channels not requiring time or frequency offsets such as are needed for mixed-numerology channels. |
| 2 | Reserved for future use | |
| 3 | PRACH and mixed-numerology channels | Channels requiring time or frequency offsets or different-than-nominal subcarrier spacing (SCS) values. |
| 4 | Reserved for future use | |
| 5 | WD scheduling information (WD-ID assignment to section) | Provides scheduling information for WD-IDs. |
| 6 | Channel information | Sends WD-specific channel information from the O-DU to the O-RU. |
| 7 | LAA | Messages communicated between O-DU and the O-RU in both directions to configure listen before talk (LBT) for physical downlink shared channel/demodulation reference signal (PDSCH/DRS) transmission and to report the LBT outcome. |
| 8-255 | Reserved for future use | |

Some embodiments may include using an unused section type identifier (ID) for "radar pulse and waveform notification" data. FIG. 6 illustrates an example section type for "radar pulse and waveform notification" data. As can be seen in the example section type in FIG. 6, the example message is shown arranged in sections of 8 bytes of information shown from the most significant byte (msb) to the least significant byte (lsb), such that octets 1-8 include a transport header, octet 9 includes a payload version field, octet 10 includes a frame identifier (ID) field, octet 11 includes a subframe ID and a slot ID field, octet 12 includes another slot ID field, octet 13 is reserved, octet 14 includes the section type value field (8 in this example), octets 15 and 16 are reserved, octet 17 includes the radar message type (RadarMsgType) field and radar message length (RadarMsgLen) field and octets 18+ include the payload plus a padding to a 32-bit boundary. This arrangement is an example and it is contemplated that the message may be arranged in other ways.

value of 1 in the RadarMsgType field may indicate a radar waveform metadata payload structure.

In some embodiments, the pulse metadata RadarMsgType may include one or more of the following example fields in the payload:
    Pulse power peak (absolute);
    Pulse center frequency (e.g., in Hertz (Hz));
    Pulse width in frequency (e.g., Hz);
    Pulse width in time (e.g., nanoseconds);
    Pulse timestamp (absolute time or relative to a radio frame or subframe); and/or
    Pulse chirp (frequency variance characteristics)

In some embodiments, the radar waveform metadata RadarMsgType may include one or more of the following example fields in the payload:
    Radar waveform type (enumerated depending on which regulatory domain the RU network node 16a is operating within, e.g., Radar Waveform type 0-4 for short pulse radar waveforms and type 5 for long pulse radar waveforms);

Number of pulses detected;
Timestamps (first pulse, last pulse); and/or
Detection interruption indicator(s).

In some embodiments, the fields in both RadarMsgType formats may be fixed or may be structured into elements using e.g., Tag, length, value (TLV). For example, the "Pulse width" field may be structured to have a tag value=1, a length value=1 and the value field carrying the actual pulse width.

Zero, one or multiple "radar pulse and waveform notification" section types may be present in the uplink (UL) message (an UL message being a message from the RU network node 16a to the DU network node 16b or management network node 16c). For example, when no pulse or radar waveform have been detected, the section type may not be included. In another embodiment, when multiple radar pulses have been detected, the metadata for each radar pulse is placed in a separate "radar pulse and waveform notification" section type within the same UL message.

Other signaling formats are possible in some embodiments of the present disclosure, including proprietary formats used for example with vendor proprietary CPRI fronthaul interfaces.

Management/Configuration Signaling

Some embodiments may define fronthaul interface management plane signaling structures and information elements for pulse and/or radar formats to be detected by the RU network node 16a. In some embodiments, these fronthaul interface management plane signals/messages are sent from the management network node 16c (or in some embodiments, the DU network node 16b) to the RU network node 16a via the fronthaul management plane interface (labelled "lls—M" in FIG. 5).

The following embodiments describe how a RU network node 16a may be configured with radar pulse and/or radar waveform parameters from e.g., a management system function. These parameters may be used by the radar pulse and/or radar waveform detection algorithm(s) in the RU network node 16a (e.g., in radar detector 24).

The signaling or message structure of these radar pulse and/or radar waveform parameters may take many forms, e.g., ORAN management plane Network Configuration Protocol (NETCONF)/Yang models or proprietary formats. Some embodiments provide for these parameters to be sent on a fronthaul management plane interface. In some embodiments, these parameters may be sent from a management system (e.g., management network node 16c) to the RU network node 16a over a separate management Internet Protocol (IP) network using the NETCONF/Yang protocol. In other embodiments, the radar pulse and/or radar waveform parameters may be sent within the fronthaul eCPRI link(s) as management signals.

The radar pulse and/or radar waveform parameters may be sent from the management network node 16c (or in some embodiments, the DU network node 16b) to the RU network node 16a during, for example, RU configuration procedures after the RU network node 16a has advertised its capabilities of performing pulse and/or radar waveform detection.

For example, in some embodiments, an RU network node 16a supporting pulse and/or radar detection may indicate one or more of the following capabilities in its capability response message to the management network node 16c (or in some embodiments, the DU network node 16b):
Radar waveform detection yes/no (Y/N);
Radar waveform detection software (SW) version;
Pulse detection Y/N;
Pulse Detection SW version;
Pre-Installed support for detecting FCC radar waveforms Y/N;
FCC radar waveform definition revision;
Pre-Installed support for detecting European Telecommunications Standards Institute (ETSI) radar waveforms Y/N;
ETSI radar waveform definition revision;
Support for user defined pulse definitions Y/N; and/or
Support for user defined radar waveform definitions Y/N.

Figure 7:
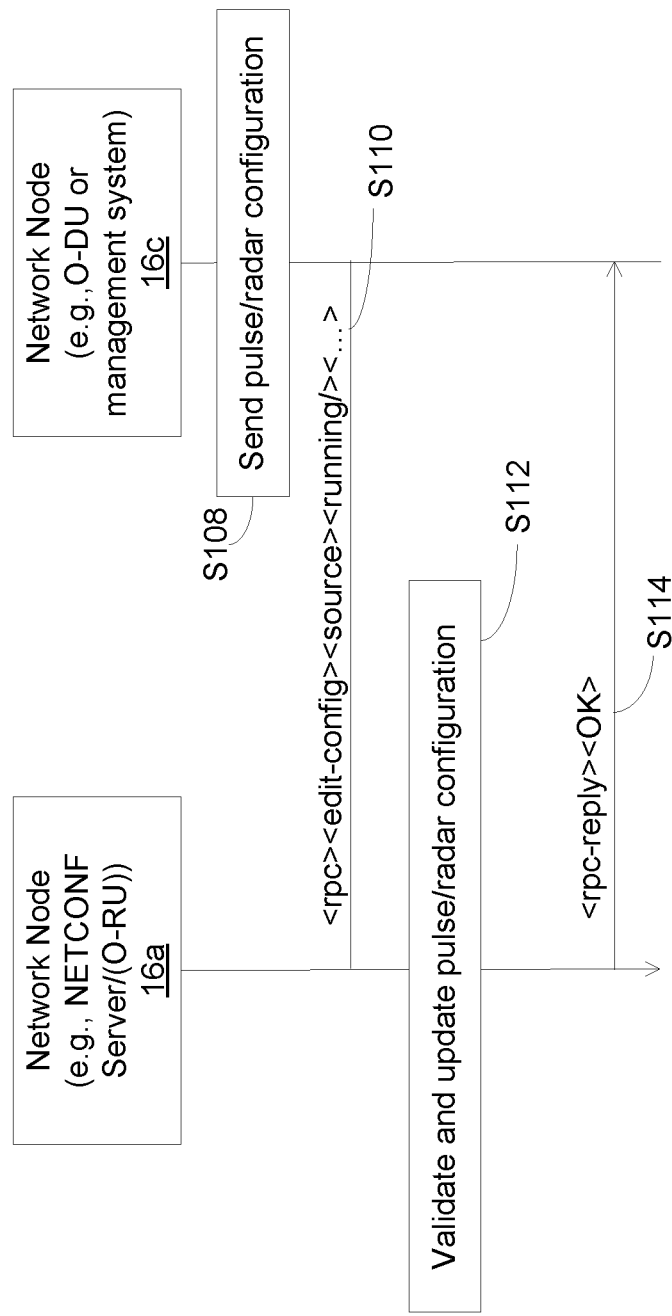
FIG. 7 is a flowchart of an example call flow diagram according to some embodiments of the present disclosure.

After the capabilities have been exchanged (e.g., sent by RU network node 16a to management network node 16c or the DU network node 16b via interface 41), if both the management network node 16c and RU network node 16a can configure radar pulse definitions and/or radar waveform definitions, RU configuration may be performed using a "modify configuration" or "edit configuration" procedure, such as, the example procedure shown in FIG. 7.

As shown in FIG. 7, the example procedure includes, in step S108, network node 16c (e.g., management system or O-DU) running a send pulse/radar configuration function. In step S110, network node 16c sends an edit/modify configuration message to RU network node 16a using e.g., Network Configuration Protocol (NETCONF). The edit/modify configuration message may include one or more pulse and/or radar definition parameters. In step S112, RU network node 16a runs a validate and update pulse/radar configuration function, updating its pulse/radar configuration according to the pulse/radar definitions in the configuration message. In step S114, RU network node 16a sends a reply message to network node 16c, indicating the RU network node 16a has updated its pulse/radar configuration according to the configuration message.

In some embodiments, pulse definition parameters that e.g., the management network node 16c or DU network node 16b sends to the RU network node 16a may include one or more of the following:
Minimum pulse peak power;
Minimum and maximum pulse width in frequency;
Minimum and maximum pulse duration in time;
Whether pulses are chirped or linear; and/or
Chirped pulse frequency change.

In some embodiments, radar waveform definition parameters that e.g., the management network node 16c or DU network node 16b sends to the RU network node 16a may include one or more of the following:
Duration of waveform;
Pulse definition in waveform;
Pulse Repetition Interval;
Number of pulses in waveform type; and/or
Minimum number of pulses in waveform to detect.

In some embodiments, a radar waveform definition may also be defined by a radar type value. For example, Radar Waveform type may be enumerated according to numbering depending on which regulatory domain the RU network node 16a is operating within, e.g., Radar Waveform type 0-4 for short pulse radar waveforms and type 5 for long pulse radar waveforms.

Some embodiments of the present disclosure have been described which may define data structures and protocol procedures in fronthaul interface (e.g., control plane and/or management plane) protocol specification to support signaling of radar pulse and waveform metadata between RUs and DUs connected by an interface, such as, for example, CPRI-like interfaces including ORAN LLS control plane interface.

Some embodiments of the present disclosure have been described which may define data structures and protocol procedures in management plane interface specifications to support signaling of radar pulse and waveform characteristics between a DU and RU(s).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Description |
| --- | --- |
| CPRI | Common Public Radio Interface |
| CUS | Control, User and Synchronization (planes) |
| DFS | Dynamic Frequency Selection |
| DU | Digital Unit |
| KDB | Knowledge Database |
| LLS | Lower Layer Split |
| MP | Management Plane |
| NR-U | NR-Unlicensed (NR operating in unlicensed spectrum) |
| RU | Radio Unit |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a radio unit, RU, network node, the method comprising:
   detecting a radar signal; and
   based at least in part on the detection, sending a message to one of a digital unit, DU, network node and a management network node, the message comprising information about the detected radar signal, the information about the detected radar signal including radar pulse metadata, the radar pulse metadata including at least one of a peak power, center frequency, width, time stamp and chirp of a pulse of the radar signal.

2. The method of claim 1, wherein detecting the radar signal further comprises:
   detecting the radar signal within a frequency spectrum in which radar signals co-exist with Radio Access Network, RAN, signals.

3. The method of claim 1, wherein sending the message further comprises:
   sending the message to the DU network node via a fronthaul control plane interface.

4. The method of claim 1, wherein sending the message further comprises:

sending the message to the management network node via a fronthaul management plane interface.

5. The method of claim 1, further comprising:
comparing the detected radar signal to at least one predetermined radar waveform characteristic; and
determining whether the detected radar signal matches the at least one predetermined radar waveform characteristic.

6. The method of claim 5, wherein when the detected radar signal matches the at least one predetermined radar waveform characteristic, the message includes radar waveform metadata.

7. The method of claim 5, further comprising:
receiving information indicating the at least one predetermined radar waveform characteristic from at least one of the management network node and the DU network node.

8. The method of claim 1, wherein the RU network node is a remote radio head network node and the DU network node is a baseband processing node of a Radio Access Network, RAN, base station.

9. A method implemented in a network node, the method comprising:
receiving a message from a radio unit, RU, network node, the message comprising information about a radar signal detected by the RU network node, the information about the detected radar signal including radar pulse metadata, the radar pulse metadata including at least one of a peak power, center frequency, width, time stamp and chirp of a pulse of the radar signal; and
as a result of the received message, performing an operational task.

10. The method of claim 9, wherein the radar signal is detected within a frequency spectrum in which radar signals co-exist with Radio Access Network, RAN, signals.

11. The method of claim 10, wherein performing the operational task comprises:
as a result of the received message, at least one of:
determining to stop transmitting RAN signals within the frequency spectrum in which the RAN signals co-exist with radar; and
switching to another frequency spectrum not co-existing with radar.

12. The method of claim 9, wherein the network node is a digital unit, DU, network node and the receiving the message further comprises:
receiving the message via a fronthaul control plane interface.

13. The method of claim 9, wherein the network node is a management network node and the receiving the message further comprises:
receiving the message via a fronthaul management plane interface.

14. The method of claim 9, further comprising:
sending information indicating at least one predetermined radar waveform characteristic to the RU network node.

15. The method of claim 9, wherein performing the operational task comprises:
as a result of the received message, using the information in the message to determine whether the detected radar signal corresponds to a matching radar waveform.

* * * * *